INVENTORS
WILLIAM L. KING &
EDWARD S. STEIN

BY Patterson, Wright & Faterson
ATTORNEYS

INVENTORS
WILLIAM L. KING &
EDWARD S. STEIN

BY Patterson, Wright & Stein [signature]

ATTORNEYS

United States Patent Office 3,705,963
Patented Dec. 12, 1972

3,705,963
MATRIX SWITCH WITH SLIDE TYPE ACTUATOR AND CONDUCTIVE SPRING COMMON TO GROUND CONTACT AND MOVABLE CONTACT

William L. King, 12059 Milton Ave., Wheaton, Md. 20902, and Edward S. Stein, 5717 Nevada Ave. NW., Washington, D.C. 20015

Filed Aug. 5, 1971, Ser. No. 169,181
Int. Cl. H01h *1/44, 15/06*
U.S. Cl. 260—16 C 3 Claims

ABSTRACT OF THE DISCLOSURE

A switch device including a series of spaced conductor points and a sliding switch bar movable from one to another of said conductors with means biasing said sliding switch bar into continuous contact, alternatively, with an indexing surface and said spaced conductor points.

The present invention relates primarily to switch devices and primarily to devices commonly known as crossbar or matrix switches. In either type of electrical switch, a matrix of columns or rows of conductors is so arranged that a slideable switch arm or bar may be placed and moved to form alternate contact with said conductors at spaced intersections therewith.

Switch devices of the type herein disclosed may be employed where ever a set of conditions, quantities or characteristics must be pre-set in a multiplicity of points to be interrogated at some subsequent point in time. A possible application would involve programming the conditions of a test for a testing machine. Another possible application might occur in a data entry system wherein the switch would be set to specify the amount of a transaction. Still another possible application would be in learning or teaching devices in which the switch would be used to program a set of answers to queries which a student would attempt to answer successfully by selective manipulation or operation of the controls of the switches.

In each of the example applications given the operator would inert the amount of quantity or condition for each row or column of conductors by moving the slideable switch bar into a position corresponding to a desired entry. This function would be carried out for each row of conductors by moving the arm for that row until all rows have been set and each digit or value has been selected. The switch is then interrogated automatically by the logic included in the device of which the switch is an integral part.

The prior art has taught that the function of a matrix switch using sliding switch elements may be accomplished by grouping separate assemblies of switch elements, indexing means and switch contacts or conductors to form a multiplicity of selective or selection circuits. An example of such prior art teaching is found in United States Letters Patent No. 3,205,319, in which is described an assembly which provides a series of intersections between conductor rows which are printed on two spaced circuit boards, top and bottom of the switch, with a movable switch contact interposed therebetween.

It is a primary object of the present invention to provide a matrix type switch which has substantailly improved construction and operating function over prior art devices of similar purpose.

It is a further object of the present invention to provide a matrix switch which is of simple and inexpensive manufacture, yet which is constructed of few moving parts and which is inherently long-lasting and durable over extended periods of use.

Still other objects and advantages of this invention will become more readily apparent to one skilled in the art when the following description is read in the light of the accompanying drawings.

Figures 1, 2:
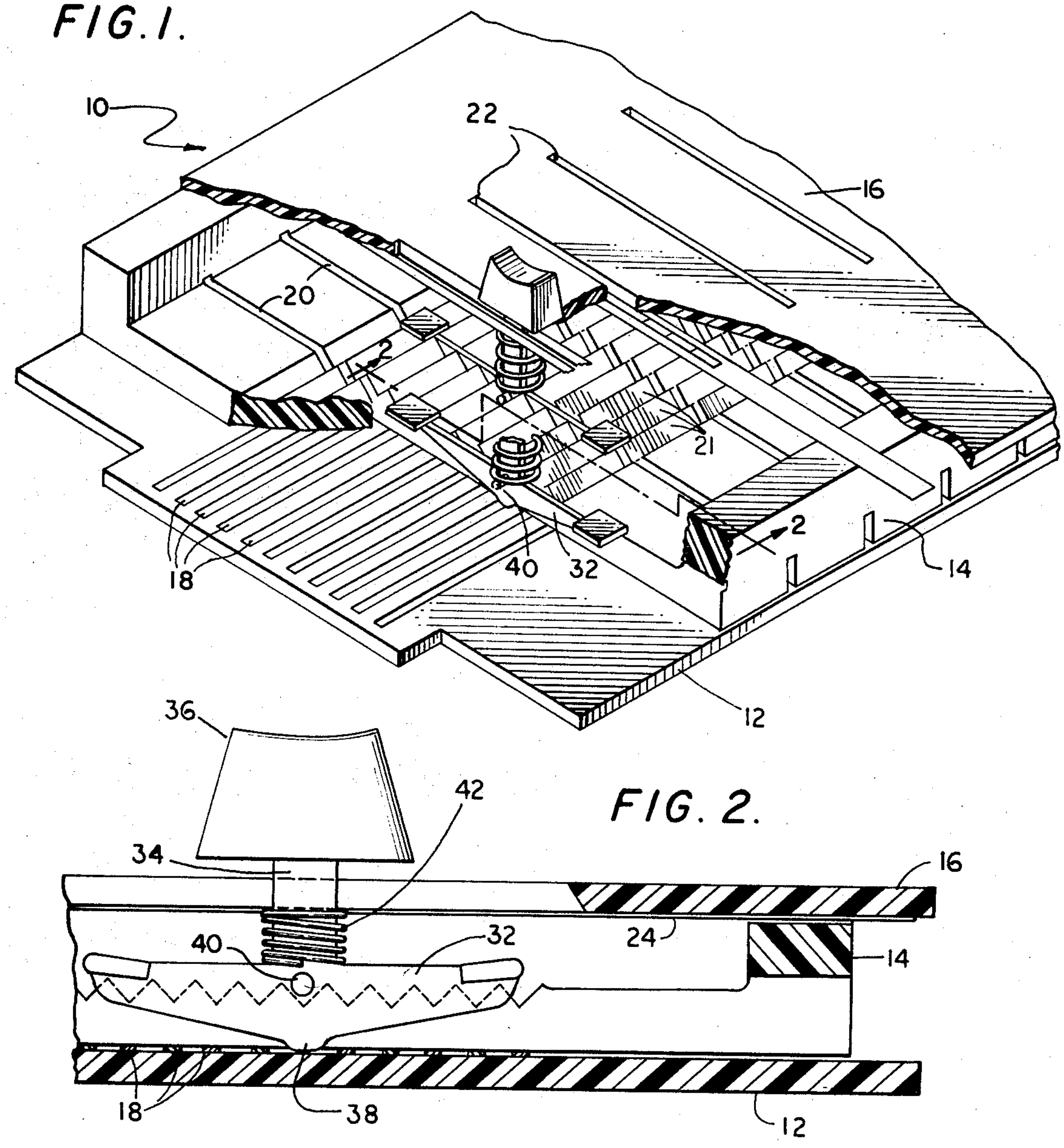
FIG. 1 is a sectional, fragmentary view of the switch.
FIG. 2 is a fragmentary, vertical section of the switch.

Referring now to the accompanying drawings in which like numerals designate similar parts through the several views, 10 generally designates the switch subject of the present invention which includes in its assembly a bottom or base plate 12, an intermediate indexing plate 14 and a top plate or member 16.

A central portion of the bottom or base plate member is provided with a series of parallel rows of conductor members or elements 18 imbedded in the upper face thereof and extending in one direction thereof. The indexing member 14 is of a generally U-shaped configuration in end view and supports the top plate member 16 in a bridging condition across the upper extremity of the upstanding side elements or portions of the U-shaped configuration thereby supporting the top plate member in parallel spaced relationship above the base member 12.

The indexing member is provided in the upper surface thereof with a series of uniform serrations 21 of sharp toothed configuration which are arranged in parallel, side by side relationship in one direction of the indexing member and in parallel relationship with and immediately above the rows of conductor elements 18 in the base member therebeneath. The indexing member is additionally provided with a series of vertical slots 22 formed in parallel spaced relationship therein and in perpendicular relationship to the serrations in the upper face of said indexing means and also in perpendicular relationship to the conductor elements 18 in the base member therebeneath.

Figure 4:
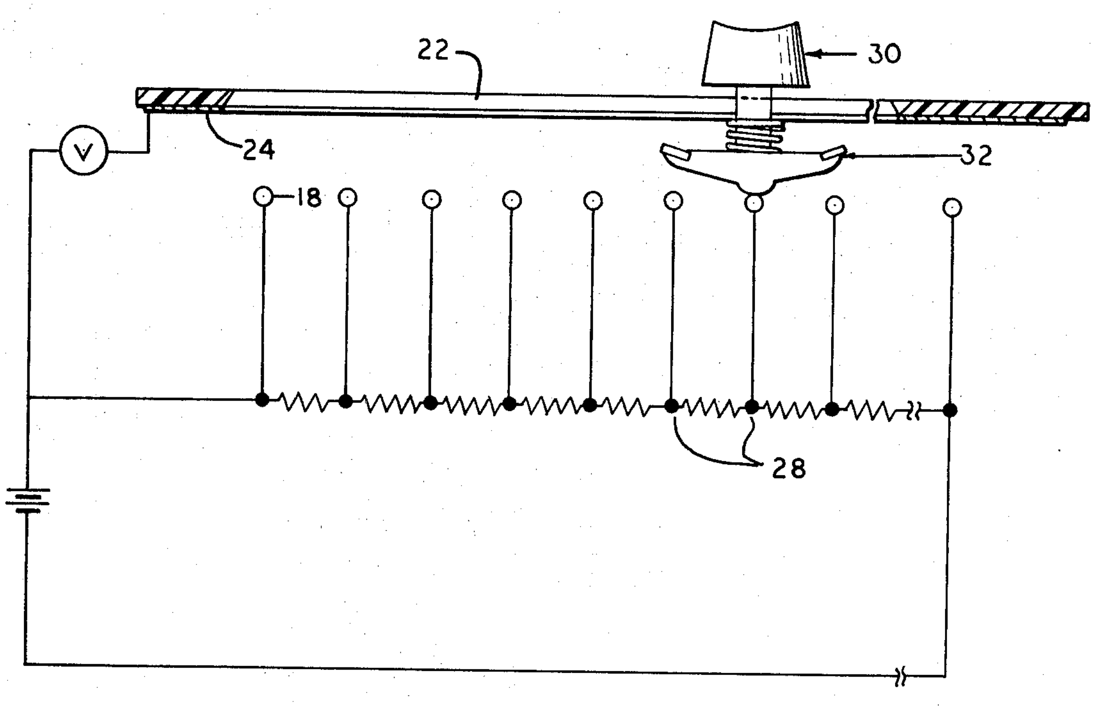
FIG. 4 is a schematic view of the circuit diagram.
Figure 5:
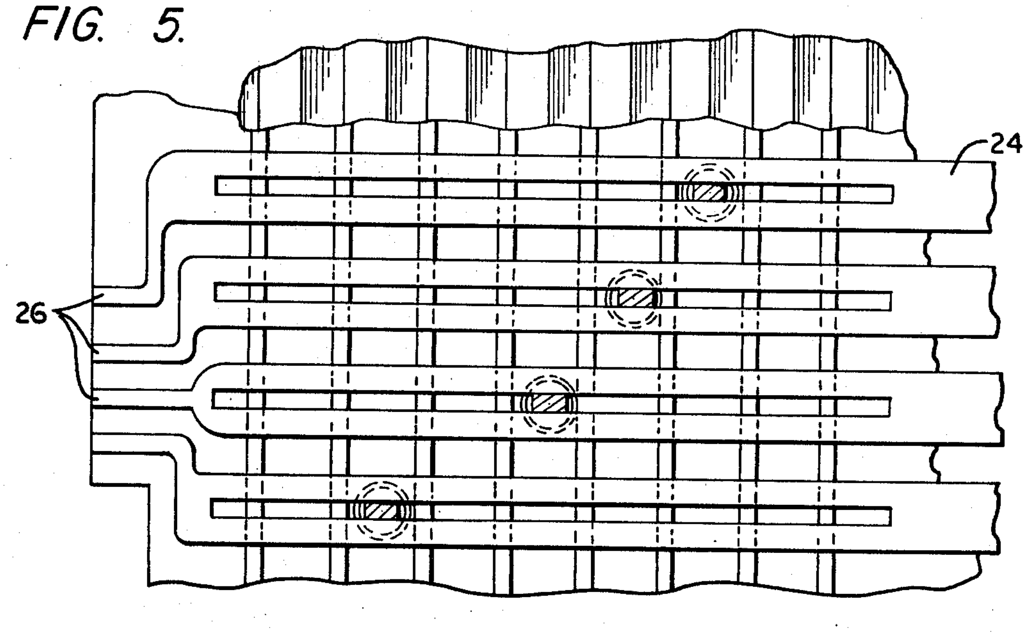
FIG. 5 is a partial bottom plan view of the top plate member.

The top plate member 16 is provided with a series of vertical slots 22 therethrough in vertical registry above the vertical slots 20 in the indexing member there-beneath. The under side of the top member 16 for spaced distances on either side of said slots therein is provided with a conductive surface 24 which conductive surfaces, as may be seen in FIG. 5, terminate adjacent one side each of said top member in circuit connector configurations 26. At the same time, the conductor elements 18 in the base plate member are similarly connected into a prescribed circuit as at 28 in FIG. 4 of the drawings.

Associated with each of the vertically aligned pairs of slots 20 and 22 is a switch element generally designated at 30 which consists of a rocker contact bar 32, a vertical connector 34 and an insulated handle cap 36. The rocker bar is mounted to slide longitudinally in one of the slots 20 in the indexing member with the base pivotal point 38 of the rocker bar riding over and in alternate contact with the conductor elements 18 in the base member beneath said slot 22. A short transverse pin 40 in said rocker bar projects laterally on either side thereof and engages with the serrated indexing surface on either side of said slot 20. In the form of the invention shown in FIG. 2, a coil spring 42 is positioned around the extension member 34 and is interposed between the upper conductive face of the rocker arm and the conductive material on the underside of the top panel member adjacent the slot 22.

Figure 3:
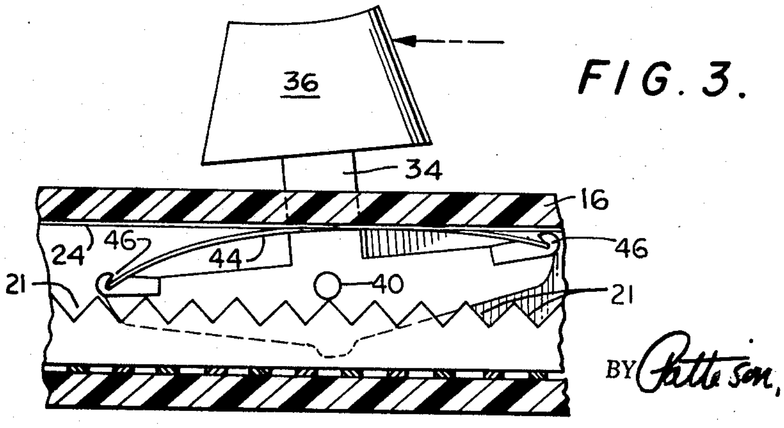
FIG. 3 is a view similar to FIG. 2 of a modified form of the switch in a different contact position.

In the modified form of the device shown in FIG. 3 a flat spring 44 secured in detent formations 46 at the extreme ends of the rocker bar is biased in engagement with the conductive surface 24 as aforesaid.

From the foregoing description it may be seen that a switch device is provided wherein individual switch arms or bars are movable selectively in relationship to a series of conductor elements in the base element of the switch and in continuous electrical contact with a conductive material on the side of the top switch plate, thereby providing alternate switch portions throughout the length of the available movement of the switch arm. It is additionally seen that the continuous engagement of the pin element 40 of each switch arm with the serrated surface of the indexing means provides a positive snap action between each position of the switch arm in respect to the conductor elements of the base plate, affording a positive "feel" of the multiple positions of each switch arm.

It is further evident, and it is illustrated in FIG. 3 of the drawings, that movement of the switch bar or arm, as indicated by arrow, will produce a camming action of the switch to provide positive release and contact of the arm with each switch position relating to each of the opposing conductor elements in the base element of the switch. From the foregoing it is seen that an improved matrix switch has been provided which is capable of molded component construction and which is subject of low-cost manufacture and long-lasting use with the attributes of an improved and positive switching action.

Having thus described and explained our invention, what we desire to claim is:

1. A switch assembly comprising, a base member of insulated material having therein a plurality of spaced parallel conductors, each terminating in a circuit connector, an indexing unit consisting of a member overlying said base member and having a plurality of slotted apertures therethrough extending in parallel one with the other and perpendicularly to the conductors of said base member, a series of toothed indexing indentures formed in the upper surface of said indexing member perpendicularly to and intersecting said slotted apertures therein, a top member supported above said indexing means and in spaced relationship to said base member, a series of slotted apertures in said top member arranged in parallel spaced relationship and disposed in vertical registry one above each of the slotted apertures in said indexing member, a conductive material on the underside of said top member adjacent each slotted aperture therein, and a contact bar having a central depending contact element movably mounted longitudinally of the slotted apertures in said indexing means with the contact element thereof movable into and out of engagement with the spaced conductors in said base member, an actuating handle for said contact arm extending vertically through the slotted aperture in the top plate in vertical registry there-above for manual movement of said contact bar, means integral with and extending transversely of said contact bar engageable with the toothed indexing surface of said indexing means, means interposed between said contact bar and the undersurface of said top member biasing said transverse means into surface contact with said toothed indexing surface, and said resilient means forming a circuit closing element between the conductors of said base member and the conductive material on the underside of said top member.

2. A switch assembly as defined in claim 1 wherein said biasing means consists of a coil spring encircling said actuating handle and engaging the contact arm at one end and the conductive underside of the top member at the other end.

3. A switch assembly as defined in claim 1 wherein said biasing means consists of a flat spring supported between the remote ends of said switch bar with an intermediate portion thereof engaging the conductive underside of the top member at the other end.

References Cited

UNITED STATES PATENTS

| | | | |
|---|---|---|---|
| Re. 24,586 | 1/1959 | Davis | 200—16 C |
| 3,027,506 | 3/1962 | Stenhammer et al. | 200—16 D |
| 3,205,319 | 9/1965 | Anderson et al. | 200—16 C |
| 3,467,922 | 9/1969 | Greenwall, Jr. et al. | 200—16 C X |
| 3,493,706 | 2/1970 | Cherry et al. | 200—16 D X |
| 3,632,909 | 1/1972 | Rowley | 200—16 D |

JAMES R. SCOTT, Primary Examiner